S. KARASICK.
SINE ANGLE PLATE.
APPLICATION FILED DEC. 14, 1918.

1,409,343. Patented Mar. 14, 1922.
2 SHEETS—SHEET 1.

INVENTOR
Samuel Karasick.
BY
ATTORNEY

S. KARASICK.
SINE ANGLE PLATE.
APPLICATION FILED DEC. 14, 1918.
1,409,343.
Patented Mar. 14, 1922.
2 SHEETS—SHEET 2.
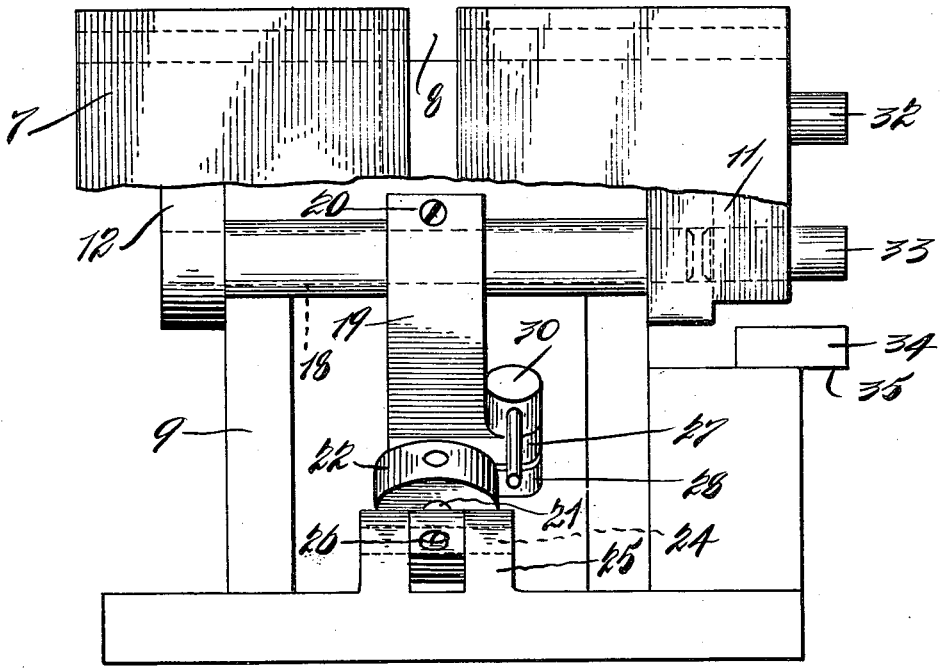
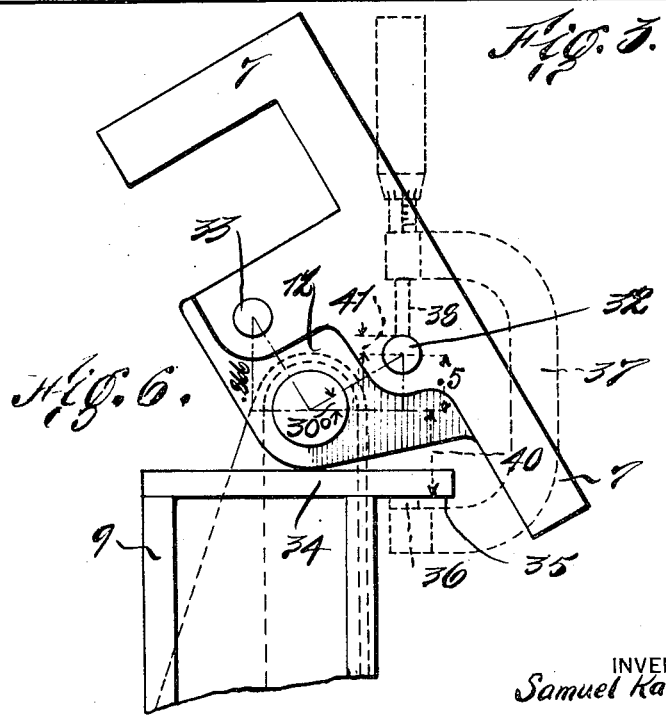
INVENTOR
Samuel Karasick
BY
Philip C. Peck
ATTORNEY

UNITED STATES PATENT OFFICE.

SAMUEL KARASICK, OF NEW YORK, N. Y.

SINE ANGLE PLATE.

1,409,343.   Specification of Letters Patent.   Patented Mar. 14, 1922.

Application filed December 14, 1918. Serial No. 266,830.

*To all whom it may concern:*

Be it known that I, SAMUEL KARASICK, a citizen of the United States, and a resident of the city, county, and State of New York, have invented certain new and useful Improvements in Sine Angle Plates, of which the following is a specification, reference being made to the accompanying drawings, forming a part thereof.

My invention relates to that class of devices used for miscellaneous purposes in laying out or testing work where required angles are involved, and particularly in accurately determining and testing the angle positions at which articles may be securely held and clamped on the surface of a movable plate which is adjusted to operative position preparatory to machining operations on the work either lengthwise or crosswise, which angle positions must be calculated and rigidly fixed not only with great accuracy but also by means permitting of subsequent tests being made of the angles so determined and fixed.

Heretofore such devices as are in common use in tool rooms and machine shops generally comprise a movable sine bar pivoted on a stud which may have a vertical adjustment to accommodate work of different thicknesses or diameters. In using such devices the distance from the center of the pivot stud of such sine bar to the center of a fixed stud mounted on one end thereof is fixed and constitutes the hypotenuse of a right angle triangle the base of which is a horizontal line through the center of the pivot 10 (see Fig. 6) intersecting a vertical line drawn through the center of said stud, the angle between the hypotenuse and base of this triangle constituting the angle to be determined and tested; to determine any given angle by the use of such form of sine bar, the height of the pivot stud is measured from the base which height is then subtracted from the varying height of the swinging stud located on the sine bar's end extending vertically from such base. The difference in these heights is then divided by the fixed hypotenuse (say five inches being the distance between the two studs), and the result will be the sine of the given angle.

The object of my invention, among other things, is to provide a sine angle plate of simple, efficient and rigid structure for direct sine measurement, by which the necessity of such subtractions and divisions to secure the required angle adjustment may be eliminated, the sine or the cosine of any required angle for the work being primarily utilized to determine the necessary adjustment and setting of the movable work-holding plate whereby the structure may combine in itself not only means for securely holding the work at a fixed angle for the machining operation, but also an adjustable work-holding plate structure movable through a quadrant. By my improved device the unskilled workman may adjust and securely and rigidly set in operative position the angle plate at any fixed angle by aid of micrometer readings which will correspond exactly with the sine and cosine values of the angle desired for such machining operation, such sine and cosine values as shown on the micrometer, or other similar measuring device, serving to determine and thereafter test the adjustment of the work-holding plate or the required angle. Such complementary readings of the angle's sine and cosine and subsequent movement of the plate also become necessary for accurate adjustment when the required angle approaches ninety (90) degrees, since greater accuracy is attained by such coordinating method as there is a greater difference in the sine per degree, and vice versa for the cosine when the angle approaches zero degrees.

A further object is to provide means whereby the combined adjustment and support of the angle-plate may be easily and accurately accomplished, along with means to rigidly support the plate by locking such plate-adjusting devices securely in their predetermined position, after the required angle for the movable plate has been accurately determined and fixed according to sine and cosine values appearing in any table of trigonometrical functions.

With the above and other objects in view, my invention comprises the novel construction, combination and arrangement of parts as will be hereinafter more fully described and particularly pointed out in the appended claims.

A preferred embodiment of my invention is illustrated in the accompanying drawings in which—

Figure 3 is an end view looking from the left in Figure 1;

Figure 6 is a diagrammatic fragmentary side elevation showing the manner of setting the movable plate at a desired angle by means of a micrometer.

Similar numerals refer to similar parts throughout the several figures.

Figure 2:
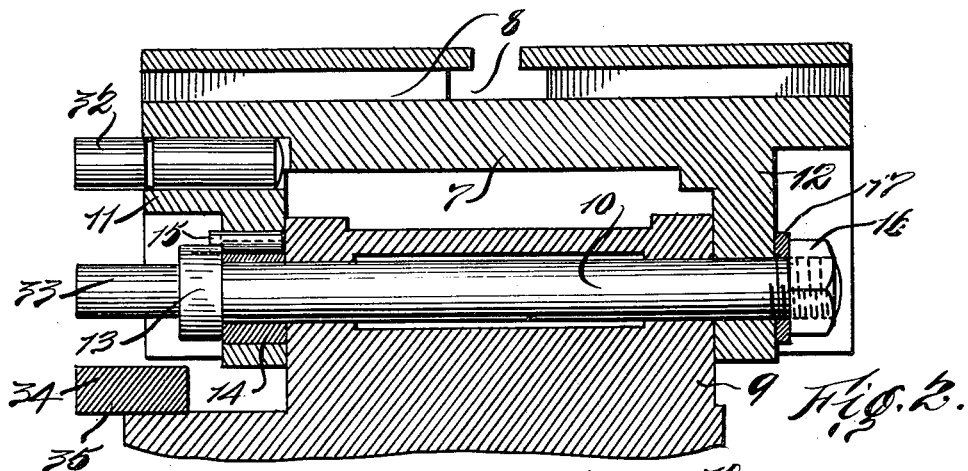
Figure 2 is a sectional view taken on the line 2—2 of Figure 1 looking in the direction of the arrow.

Referring to the drawings the angle plate comprises the movable plate 7, the top surface of which is provided with the customary T-slots 8 for adjusting and securing the clamps (not shown) usually employed to hold the articles of work in any desired position on the plate 7. This plate 7 is swivelled on a stationary base or supporting member 9 so as to move through a full quadrant. As shown in Figure 2 the bolt 10 passes through the depending lugs 11 and 12 of the plate 7 and forms the axis about which the plate 7 is moved. At one end the bolt 10 carries the head 13 bearing against the clamping sleeve 14 capable of sliding longitudinally on the bolt 10, but held against rotation thereon by the key 15 coacting with the head 13 and sleeve 14 as shown in Figure 2. The screw nut 16 bearing against the washer 17 on the opposite end of the bolt 10 enables the operator to hold the plate 7 rigidly in position by screwing down the nut 16 thereby causing the sleeve 14 to bear against the base member 9. By this arrangement both lugs 11 and 12 of the plate are held fixed without being subjected to distortion.

Figure 1:
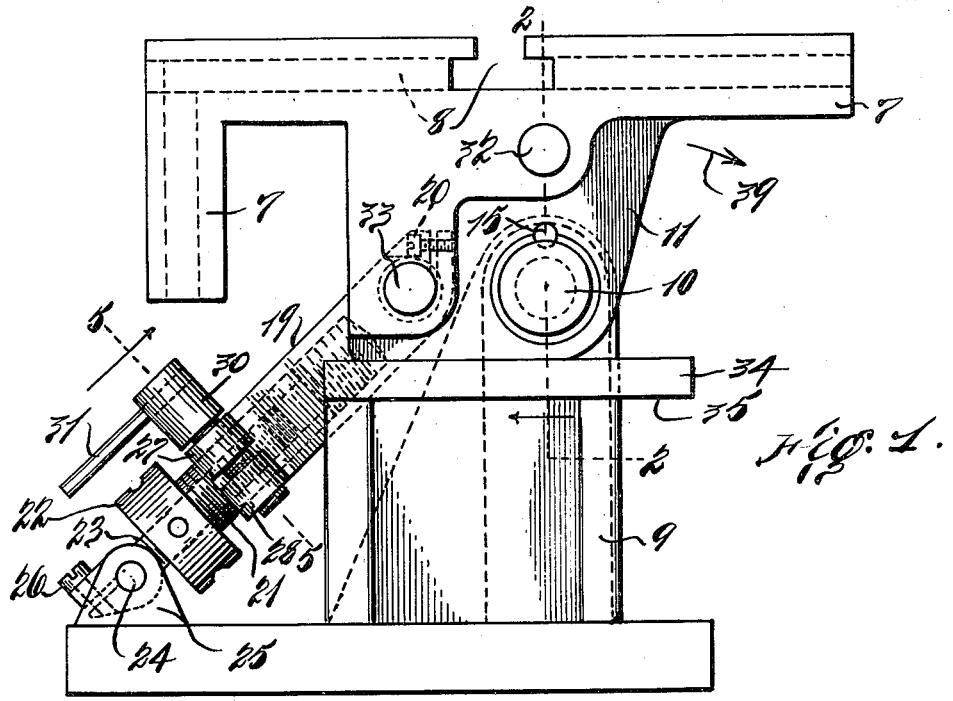
Figure 1 is a side elevation of my improved sine angle plate.
Figure 4:
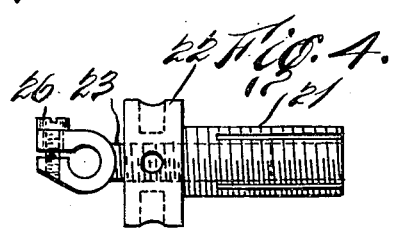
Figure 4 is a detail view showing the adjusting screws for the movable plate.
Figure 5:
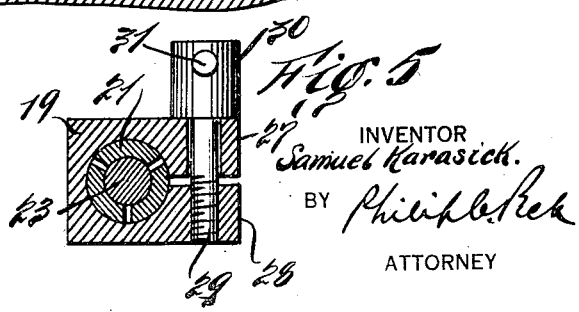
Figure 5 is a sectional view taken in the line 5—5 of Figure 1.

The movement of the plate 7 about its pivot axis 10 in the supporting member 9 is accomplished by means shown more particularly in Figures 1 and 3, such devices also supporting the plate in its required position. Transversely secured between the lugs 11 and 12 of the plate 7 is the cross bar 18 about the central portion of which is journalled the hollow interiorly threaded brace member 19 held around the bar 18 by the screw 20. Within the brace 19 is telescoped the hollow split screw 21 which is exteriorly and interiorly threaded and has the thumb nut 22 integral therewith at its lower end as shown in Figure 4. Within the hollow screw 21 passes the threaded bolt 23 adapted to coact with the interior threaded portion of the split screw 21. The lower end of the bolt 23 is journalled about the pin 24 transversely held in the brackets 25 in the base member 9, the screw 26 serving to hold the lower end of the bolt 23 about the pin 24. The exterior threads of the split screw 21 and the threads on the bolt 23 are cut so as to have different pitches, or such parts may be oppositely threaded, so that the turning of the thumb nut 22 will cause the screw 21 and bolt 23 to coact with each other to increase or diminish the distance between the axes of the rod 18 and pin 24. As shown in Figures 3 and 5, the lower end of the brace 19 is split into upper and lower jaws 27 and 28 respectively which jaws embrace the split portions of the hollow screw 21 as shown in Figure 5. Passing transversely through the jaws 27 and 28 is the clamping bolt 29 having the head 30 through which passes the operating bar 31. In Figure 1 the jaws 27 and 28 are loosened and the bolt 29 is unscrewed and unclamped, while in Figure 5 the bolt 29 is screwed down and the jaws 27 and 28 are firmly binding on the split portions of the hollow screw 21 thereby preventing any rotation thereof by means of the thumb nut 22. By turning the thumb nut 22 in one direction or the other the distance between the axes of the rod 18 and pin 24 is increased or diminished respectively by the lengthening or shortening of the coacting screw 21 and bolt 23 comprising the adjustable support which movement will rock the movable plate 7 about its axis 10 thereby shifting the angle of the plate to any predetermined position, the various coacting parts hereinbefore described also serving as a brace or support to such plate 7 on the base member 9. The subsequent screwing down of the bolt 29 clamps the jaws 27 and 28 about the hollow screw 21, thereby preventing any movement of this screw upon the bolt 23 or within the brace 19 and the plate 7 is then locked in fixed position. It is obvious that I have provided means not only for adjusting the position of the movable plate 7 and thereafter supporting same in fixed position, but also means for rigidly securing and locking such adjustable supporting means when the inclination and position of such plate have been determined.

In order to utilize the sine and cosine of any required angle to set the plate 7 in the position of such angle, I have mounted on the depending lug 11 of the plate 7 two cylindrical pins 32 and 33 which are accurately finished and are arranged upon the outer face of the lug 11 at exactly equal distances from the axis of rotation of the plate 7. As shown in Figures 1 and 6, the distances from the centers of the pins 32 and 33 to the center of the bolt 10 are exactly the same and constitute the hypotenuse of the triangles heretofore referred to. Mounted upon the base or supporting member 9 on the same side as the pins 32 and 33 is the measuring bar or plate 34 set with an over-hang as shown in the figures so that the lower or under surface 35 may be free for the anvil 36 of the micrometer 37 (shown in dotted lines in Figure 6). Any other form of measuring instrument of the usual vernier calibration may be used in my device. The screw 38 of the micrometer 37 is adapted to set over the top peripheries of the pins 32 and 33 which are arranged and fixed so that the sines of both the angle and its complement may be used, the readings therefrom directly corresponding with the sine and cosine of the required angle in any table of trigonometrical functions.

As an example of the manner in which the plate 7 may be moved and set at the required angle, I have shown in Figure 6 such plate to be fixed at an angle of thirty (30°) degrees by using a two inch micrometer in which the readings obtained correspond exactly with the tabular values for the sine and cosine of such angle, no reductions by subtraction or division being necessary as in operating the usual sine bar. The sine of the angle of 30 degrees is 0.500 and the cosine is 0.866. The micrometer will be set at 0.500 and fixed so that the anvil 36 contacts with the under surface 35. The thumb nut 22 will then be turned to rock the plate 7 upon its axis in direction of the arrow 39 shown in Figure 1 until the vertical distance between the top periphery of the pin 32 and the under surface 35 is equal to the setting of the caliper in the micrometer (0.500) which is the sine of the required angle (30 degrees). The distance 40 between under surface 35 and the center of the bolt 10 plus one-half the diameter 41 of the pin 32 or 33 forms a constant to which the sine of the desired angle is added. Hence the measuring device used will be arranged to provide for this constant. For example if the distance 40 is three-fourths (¾) of an inch, and the distance 41 (the radius of the pins 32 and 33) is one-fourth (¼) inch, the constant is one inch and a two inch micrometer would be used. By using such two inch micrometer, the distances between the under surface 35 of the plate 34 and the top of the two pins 32 and 33 when the horizontal angle is thirty (30°) degrees are 1.500 inches and 1.866 inches respectively. Since, however, the micrometer does not record the one inch measurement, the readings obtained are the actual tabular values for the sine and cosine respectively of the predetermined angle. The distance 40 may be of any desired amount and the diameter of the two pins 32 and 33 may also be of varying dimensions, but I prefer to employ the distance of one inch (or unity) for the distance between the centers of the pins 32 and 33 and the center of the bolt 10 the hypotenuse of the triangles heretofore referred to. For any reason should the distances 40 and 41 be changed it would become necessary to use a measuring instrument suitable to measure the sines and cosines of the required angles plus the constant above referred to (distance 40+distance 41); the measuring instrument must always take care of this constant in order that the tabular sine and cosine values may be directly readable on the measuring instrument.

By my improved device the accuracy of the position of the plate 7 may be determined or tested by the cosine of the predetermined angle or the sine of its complementary angle. For example in measuring for an angle of 85 degrees it would be desirable to utilize the pin 33 and measure for the cosine of such angle rather than the sine from the pin 32 as greater accuracy would be obtained since there is greater difference in the sine per degree as the angle approaches 90 degrees. In like manner as the angle approaches zero degrees there is a greater difference in the cosine per degree and measurements from the pin 32 should be employed. In any case it is but necessary to set the measuring instrument at the sine or cosine value of the predetermined angle and adjust the plate 7 until the proper pin (32 or 33) coacts with the measuring devices, the constant (distance 40+distance 41) being necessarily provided for in the size of the measuring instrument used.

It will be understood that the structure here shown and described may be variously modified and changed without departing from the advantages of my invention, provided the operation and coaction of the parts illustrating the principle of my invention are substantially as indicated. It will be also understood that the invention is not limited to any particular form of construction except in so far as such limitations are set forth in the claims.

I claim as my invention:—

1. A sine angle plate comprising a supporting member, a work-holding plate pivotally mounted on said supporting member, a measuring base plate on said supporting member, and separate means on said work-holding plate each equidistantly arranged from the axis of rotation of said plate to coact with said measuring plate.

2. A sine angle plate comprising a supporting member, a work-holding plate pivotally mounted on said supporting member, a measuring base plate on said supporting member, separate means on said work-holding plate each equidistantly arranged from the axis of rotation of said plate to coact with said measuring plate, and means to support said work-holding plate in predetermined positions.

3. A sine angle plate comprising a supporting member, a work-holding plate pivotally mounted on said supporting member, a measuring base plate on said supporting member, separate means on said work-holding plate each equidistantly arranged from the axis of rotation of said plate to coact with said measuring plate, means to support said work-holding plate in predetemined positions, and means to lock said plate supporting means.

4. A sine angle plate comprising a supporting member, a work-holding plate pivotally mounted on said supporting member, a measuring base plate on said supporting member, and a pair of cylindrical pins on said work-holding plate each equidistantly arranged from the axis of rotation of said plate and superimposed above said measuring plate to coact therewith.

5. A sine angle plate comprising a supporting member, a work-holding plate pivotally mounted on said supporting member, a measuring base plate on said supporting member, a pair of cylindrical pins on said work-holding plate each equidistantly arranged from the axis of rotation of said plate and superimposed above said measuring plate to coact therewith, and means to movably adjust and support said work-holding plate in predetermined angular positions.

6. A sine angle plate comprising a supporting member, a work-holding plate pivotally mounted on said supporting member, a measuring base plate on said supporting member, a pair of cylindrical pins on said work-holding plate each equidistantly arranged from the axis of rotation of said plate and superimposed above said measuring plate to coact therewith, means to movably adjust and support said work-holding plate in predetermined angular positions, and means to lock said plate supporting means when adjusted.

7. A sine angle plate comprising a supporting member, a work-holding plate pivotally mounted on said supporting member, a measuring base plate on said supporting member, and a pair of cylindrical pins of like diameter on said work-holding plate each equidistantly arranged from the axis of rotation of said plate and superimposed above said measuring plate to coact therewith.

8. A sine angle plate comprising a supporting member, a work-holding plate pivotally mounted on said supporting member, a measuring base plate on said supporting member, a pair of cylindrical pins of like diameter on said work-holding plate each equidistantly arranged from the axis of rotation of said plate and superimposed above said measuring plate to coact therewith, and means to movably adjust and support said work-holding plate in predetermined angular positions.

9. A sine angle plate comprising a supporting member, a work-holding plate pivotally mounted on said supporting member, a measuring base plate on said supporting member, a pair of cylindrical pins of like diameter on said work-holding plate each equidistantly arranged from the axis of rotation of said plate and superimposed above said measuring plate to coact therewith, means to movably adjust and support said work-holding plate in predetermined angular positions, and means to lock said plate supporting means when adjusted.

10. In a sine angle plate, a pivotally mounted work-holding plate, means journalled and angularly disposed therefrom on one side of its pivot to movably adjust and support said plate on its pivot, and means to lock said plate-supporting means.

11. In a sine angle plate, the combination with a pivotally mounted work-holding plate, of means to movably adjust and support said plate on its axis, comprising a rotatable interiorly threaded hollow split screw member connected with said plate and a threaded bolt attached to the base telescoped and coacting with the interior threads of said split screw member.

12. In a sine angle plate, the combination with a pivotally mounted work-holding plate, of means to movably adjust and support said plate on its axis, comprising a rotatable interiorly threaded hollow split screw member connected with said plate and a threaded bolt attached to the base telescoped and coacting with the interior threads of said split screw member, and a clamp cooperating with the split screw member to lock the latter against rotation.

13. In a sine angle plate, a pivotally mounted work-holding plate and means journalled and angularly disposed from said plate on one side of its pivot to support the latter in different positions on its pivot.

14. In a sine angle plate, a pivotally mounted work-holding plate and means journalled to said plate on one side of its pivot and angularly disposed from said plate to movably adjust and support the latter on its pivot.

15. A sine angle plate comprising a pivotally mounted work-holding plate, a measuring bar in fixed relation thereto, and separate means on said work-holding plate each equidistantly arranged from the axis of rotation of said plate to coact with said measuring bar.

16. A sine angle plate comprising a pivotally mounted work-holding plate, a measuring bar in fixed relation thereto, separate means on said work-holding plate each equidistantly arranged from the axis of rotation of said plate to coact with said measuring bar, and means to support said work-holding plate in predetermined positions.

17. A sine angle plate comprising a pivotally mounted work-holding plate, a measuring bar in fixed relation thereto, separate means on said work-holding plate each equidistantly arranged from the axis of rotation of said plate to coact with said measuring bar, means to support said work-holding plate in predetermined positions, and means to lock said plate supporting means.

SAMUEL KARASICK.